Nov. 24, 1942.　　A. W. FRANZMEIER　　2,302,991
STRAINER
Filed Oct. 16, 1939　　3 Sheets-Sheet 2
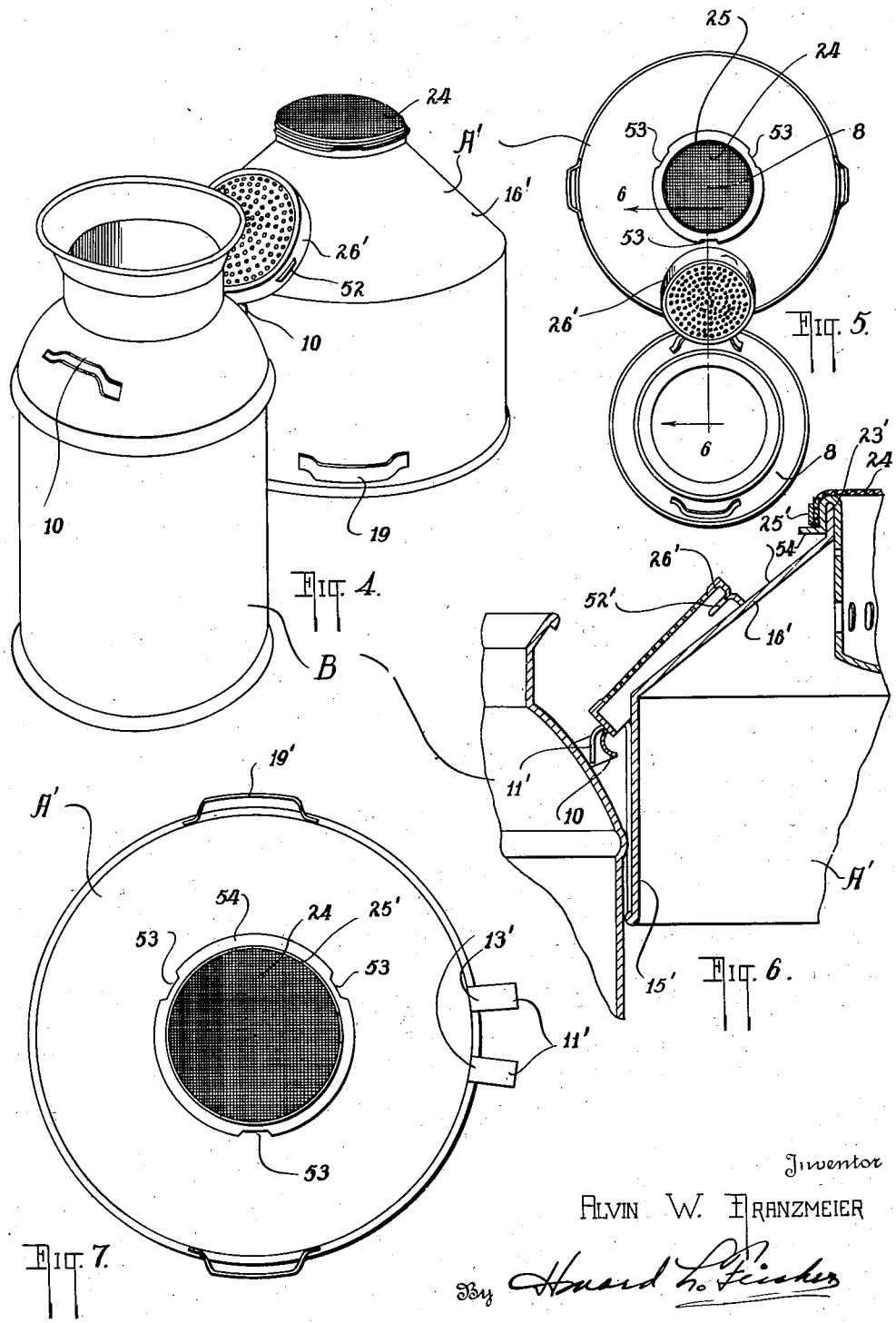

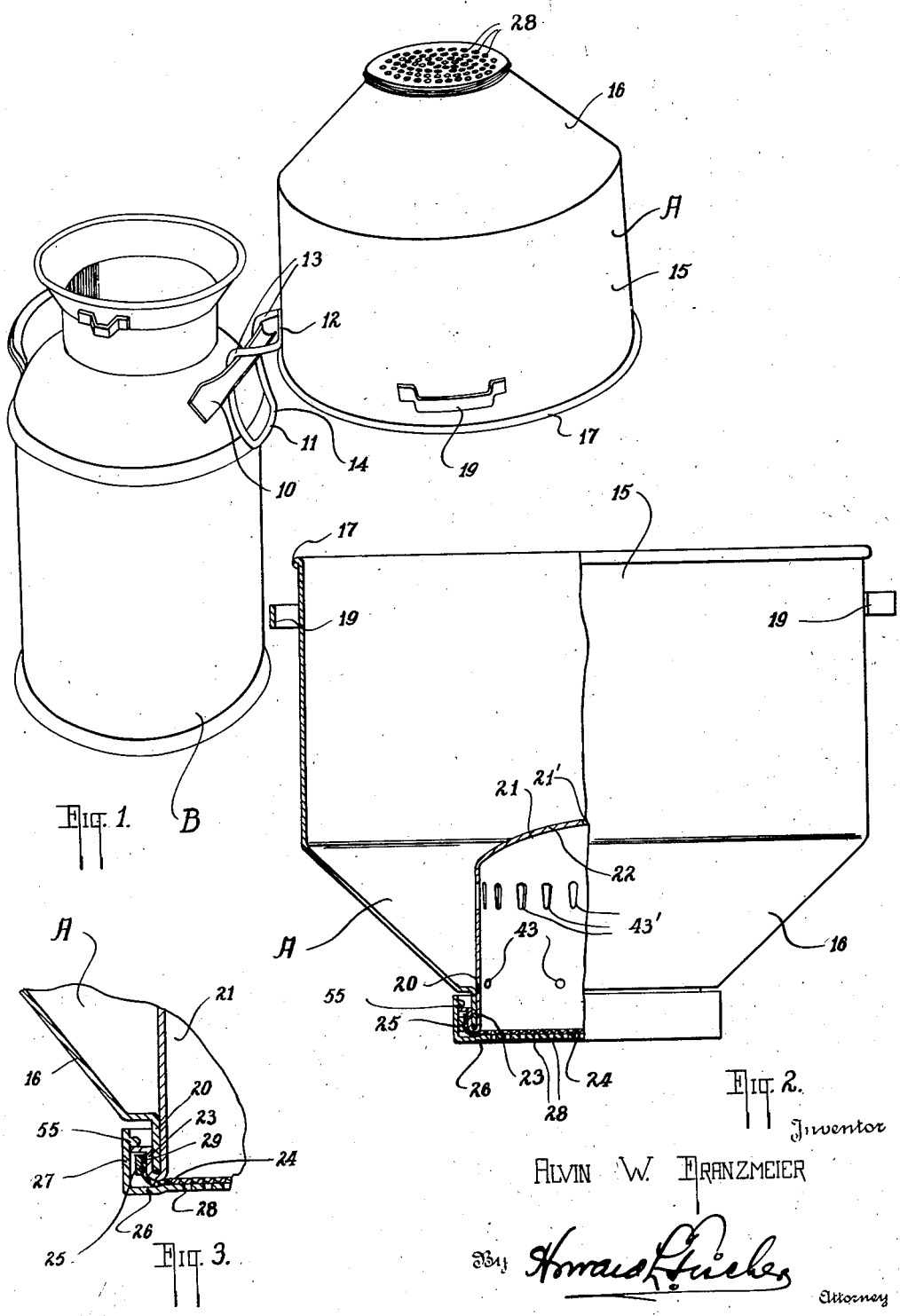

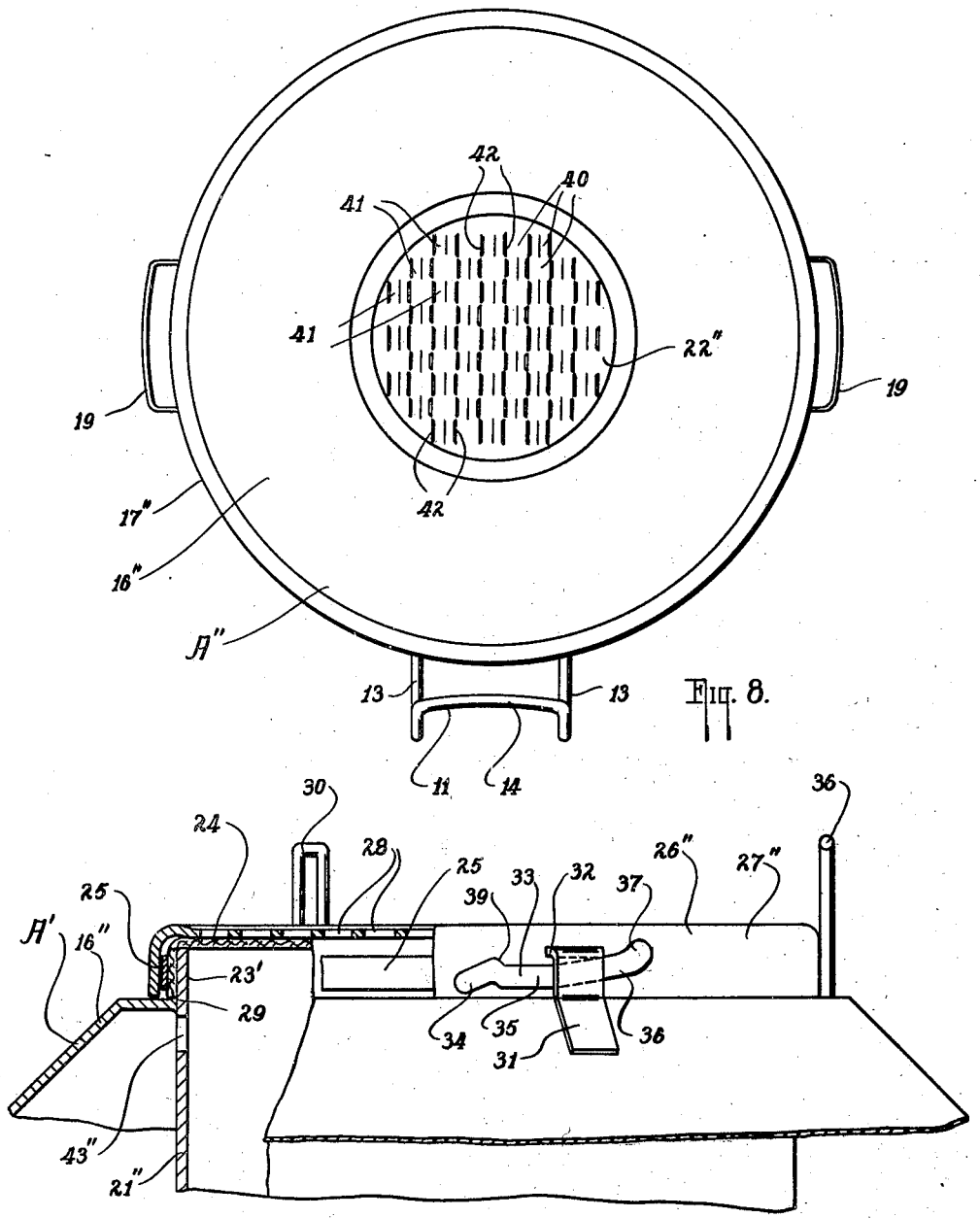

Patented Nov. 24, 1942

2,302,991

UNITED STATES PATENT OFFICE 2,302,991

STRAINER

Alvin W. Franzmeier, Rosemont, Minn., assignor of one-fourth to Howard L. Fischer, St. Paul, Minn.

Application October 16, 1939, Serial No. 299,636

2 Claims. (Cl. 210—159)

My invention relates to an improvement in milk strainers wherein it is desired to provide a sanitary strainer so devised that the straining element therein may be changed with little danger of contamination of milk subsequently strained therethrough.

In previous patents strainers have been devised which secure a straining element such as a filter pad stretched over the lower surface of a strainer for the purpose of removing impurities and larger particles of matter from the liquid being strained thereby. While some of these strainers are quite efficient and strain milk successfully, it is a purpose of the present invention to provide a simplified construction which may be made at an extremely low cost and which is virtually fool-proof.

It has been found that where difficulty is experienced in straining milk or other liquid quickly, the strainers are often shaken or jerked violently as it is found that such a shaking or jerking will cause the milk to flow more readily through the strainer. The reason why the flow of liquid through the strainer is relatively slow is probably because the impurities and material gathered upon the strainer pad have filled the pores of the strainer element. Shaking or jerking the strainer often has the effect of loosening the means holding the filtering element in place, and therefore the increase in speed of the straining operation is ordinarily due to the flow of liquid around the edges of the filter pad rather than through the same. Thus by loosening the means supporting the filter pad, the speed of flow of the liquid is increased but as a result, liquid passes through the strainer without being strained thereby.

It is a purpose of the present invention to provide a strainer construction in which the filtering element is locked in place in such a way that it is impossible for the milk to flow around the edges of the pad. This result is accomplished by providing a double locking means for the filter pad and to so arrange the elements of the strainer that one holding means for the pad cannot be loosened without entirely removing the other locking element. It is clearly obvious to the person operating the strainer when the second named locking element is entirely removed, and therefore it is clearly obvious when the strainer is not operating properly to strain the milk.

It is a purpose of my invention to provide a clamping means for clamping the strainer element in place on the lower surface of the strainer, which clamping means is removably locked to the strainer receptacle. This clamping means encloses the strainer element and acts not only to hold the element in place, but to form a support for the strainer element or pad.

It is a further feature of my invention to provide a strainer receptacle having a projecting collar extending from the lower surface of the same about which a strainer element or pad may be clamped by a peripheral band extending over the surface of the pad. This clamping band is of proper size to clamp the strainer element against the peripheral collar and no liquid may pass through the bottom of the strainer without passing through the straining element or pad when this band is in position. The band is held in place by means of the enclosing and supporting plate which is removably locked to the strainer receptacle. Thus the band cannot get out of place or cannot permit the strainer element to loosen as long as this supporting element is in place.

It is a feature of my invention to provide a locking means for locking the supporting plate to the strainer receptacle by a series of lugs engageable with inclined cam members upon the supporting plate. These cam members are so devised that the supporting plate cannot be removed from engagement with the straining receptacle unless the clamping and supporting plate is clamped more tightly against the straining element or pad during the removal thereof. In other words, in removing the clamping and supporting plate, it is necessary to clamp the straining element more tightly temporarily before the lugs on the straining receptacle will move out of engagement with the cam projections on the straining and supporting plate. Thus this plate cannot be accidentally removed from the bottom of the strainer.

It is a purpose of my invention to provide a strainer which is provided with a straining element which is clamped to the bottom surface of the strainer so that it may only be changed when the strainer is in inverted position.

A primary feature of my invention resides in providing a handle formed with and projecting from the external surface of the strainer funnel which may engage a handle of a milk can or any other projecting loop so as to hold the strainer upside down so that a new strainer element may be easily secured to the bottom of the same and causing any sediment on the inside of the strainer to drain out of the same, and away from the milk already strained. This feature is of extreme importance in the provision of a sanitary milk strainer. Heretofore, most milk strainers have required that the operator put his hands inside the funnel of the strainer to replace the strainer cloth or element. Such practice is obviously very unsanitary. I overcome these detrimental features in old strainers by requiring the operator to turn the strainer upside down, hook it onto the handle of the milk can, and proceed to change the strainer element.

It is a further feature of my invention to provide a strainer having an inwardly projecting dome with a closed top. This dome causes the milk flowing downwardly upon the same to be deflected against the inside top surface of the strainer, and therefore overcomes washing or undue force on the straining or filtering element. Thus my construction prevents the sudden flow of liquid such as milk onto the pad to injure the same.

These and other objects and novel features of my invention will be more clearly and fully set forth in the following specification and claims.

In the drawings forming a part of my specification:

Figure 1 is a perspective view of a milk can having a strainer mounted thereupon in inverted position to permit the pad or strainer element of the strainer to be changed.

Figure 2 is a cross-sectional view through my strainer, showing the relationship of the elements of the same.

Figure 3 is an enlarged sectional view of a portion of the strainer shown in Figures 1 and 2.

Figure 4 is a perspective view similar to Figure 1, showing a slightly modified form of strainer construction.

Figure 5 is a top plan view of the strainer attached to a milk can as shown in Figure 4.

Figure 6 is a sectional view through the strainer and supporting milk can, the position of the section being indicated by the line 6—6 of Figure 5.

Figure 7 is a bottom plan view of the strainer shown in Figures 4 and 5, with the supporting cover plate removed therefrom.

Figure 8 is a top plan view of a modified form of strainer.

Figure 9 is a side elevation view partly in section of the lower extremity of the strainer illustrated in Figure 8.

The strainer A is designed to be supported by a suitable supporting means such as the milk can B. As illustrated in Figures 1 and 4 of the drawings, the milk can B which is of a common type almost universally used at the present time, is provided with a handle 10 of the usual form by means of which the milk can B may be lifted. The strainer A is provided with a hook 11 which is capable of interlocking with the handle 10 as is best illustrated in Figure 1 of the drawings. The handle 11 is formed with a pair of parallel ends 12 which are welded, soldered, or otherwise secured to the exterior surface of the strainer A, and the handle intermediate the ends 12 forms a loop which is first provided with a pair of substantially parallel outwardly extending portions 13 and an upwardly extending loop portion 14. The upwardly extending loop portion 14 is, of course, downwardly extending when the strainer is inverted and is inserted through the handle 10 of the milk can B. The portions 13 are preferably of sufficient length to space the strainer A outside of the periphery of the milk can B so that any liquid draining from the strainer A will not drop upon the exterior surface of the milk can B, but will drop onto the ground or floor beneath the strainer A.

The strainer A may be of any desired shape and is shown having a substantially cylindrical upper portion 15 and a frustro-conical lower portion 16 which inclines downwardly and inwardly toward the axis of the strainer. The upper rim or edge of the strainer A is preferably rolled as indicated at 17 and handles 19 may be provided by means of which the strainer may be readily lifted.

At the base of the frusto-conical or inclined portion 16 the side wall extends downwardly into a cylindrical collar portion 20. A dome 21 is provided with an upper rounded top 22 which is preferably closed with the possible exception of a central small opening 21' at the top of the center of the dome. The cylindrical side walls of the dome 21 extend within the cylindrical collar 20 and fold over the lower extremity of the collar 20, providing an upwardly extending collar 23. This collar 23 terminates in an outwardly extending flange 54, the purpose of which will be later described in detail.

The dome element 21 is provided with spaced openings 43 at the base of the inclined portion 16 of the strainer A in order to permit all of the liquid within the strainer to enter the interior of the dome. Larger openings 43' are also provided in the side wall of the dome 21 to permit liquid to enter this dome.

Extending across the lower extremity of the dome or cup 21, I provide a strainer or filter pad element 24 which is of slightly larger dimensions than the collar 23. In order to secure this element or pad in place, I provide a flexible ring 25 or band which encircles the marginal edges of the strainer element which are folded into substantially cylindrical form thereby. The flexible band 25 clamps the filtering element stretched across the open lower end of the dome 21 and makes it necessary for any liquid entering the dome 21 to either pass through the filtering element 24 or else to work through the filter between the collar 23 and the flexible band 25. As the filter element is clamped tightly between the band 25 and the collar 23, the escape of liquid through the filtering element between these members will not take place as the liquid can more readily pass directly through the filtering pad 24.

It is recognized that if no additional means were provided to hold the clamping band and the straining element in place, there would be some danger of the band working loose with the straining pad, as the flow of liquid urged the pad downwardly. Accordingly, I provide a supporting and clamping plate 26 for holding the pad 24 in place and also for preventing the ring 25 from being disengaged from the collar 23. The supporting and clamping plate 26 is perforated at 28 as is illustrated, and is provided with a substantially cylindrical flange 27 encircling the same which incloses the marginal edge 29 of the strainer element 24 and also encloses the band 25.

The flange 54 formed by the marginal edge of the dome element 21 is provided with angularly spaced notches therein, indicated in the drawings at 53. These notches 53 are designed to accommodate inwardly extending projections 55 on the cylindrical flange 27 of the supporting and clamping plate 26. The flange 54 adjacent the notches 53 is inclined in such a manner that by passing the projections 55 through the notches 53 and rotating the supporting and clamping plate 26 with respect to the rest of the strainer, the clamping plate may be securely clamped to extend over the strainer element 24. When the supporting and receiving plate 26 is in place extending across the open end of the dome element 21, the strainer is in condition to receive milk to be strained. The strainer element 24 will be supported by the supporting plate 26 and will be marginally clamped to the collar 23 by the ring 25.

In Figures 4, 5, 6 and 7 of the drawings, I disclose a slightly modified form of construction in which the strainer A' is provided with handles 11'. These handles 11' comprise a pair of substantially flat hook-shaped elements 13' which are welded or otherwise affixed to the outer surface of the cylindrical portion 15' of the strainer A' as best illustrated in Figures 6 and 7 of the drawings. The hooks 11' extend over the handle 10 of the milk can B in the same manner that the hook 11 may extend through this handle, thus supporting the strainer A' in inverted position.

When the hooks 11' are used, the supporting and clamping plate 26' may be removed from the strainer A' and may rest on the inclined portion 16' of the strainer A', the edge of the clamping plate 26' resting against the upper edge of the handle 10 of the milk can. The position of the supporting plate 26' when supported in this manner is clearly shown in Figures 6, 7 and 8 of the drawings. As will be clearly seen, the strainer A' is similar to the strainer A in all other respects.

In Figures 8 and 9 of the drawings I disclose a type of strainer A" which is similar in general form to that which has previously been described. The strainer A" is equipped with a handle 11 identical to the handle 11 in Figure 1 of the drawings, and is also provided with handles 19 identical to the handles 19 of Figures 1 and 2. This type of strainer is provided with an upper rolled edge 17", an upper cylindrical portion similar to 15 in Figures 1 and 2, and a lower frustro-conical portion 16". The lower extremity of the portion 16" is secured by welding, soldering or other means, to the dome element 21" at a point spaced from the lower extremity of the dome element to provide a downwardly extending peripheral collar 23'. The filter pad 24 extends over the open end of the dome-shaped element 23 and is clamped by the flexible ring 25 about the periphery of the collar 23'. In order to clamp the supporting and clamping plate 26" in place, I provide a series of angularly spaced lugs or brackets 31 which are welded, soldered or otherwise affixed to the external surface of the frustro-conical portion 16" of the strainer A" and which are provided with an inwardly extending lip 32 designed to engage a projecting portion 33 on the flange 27" of the supporting plate 26". This projecting portion 33 comprises an inclined portion 34, a portion 35 substantially parallel with the bottom of the plate 26", an inclined portion 36 in communication with the portion 35, and a stop portion 37 on the end of the inclined portion 36. As will be seen from an examination of Figure 9 of the drawings, the inclined portion 34 extends to a point somewhat below the parallel portion 35 to provide a shoulder 39 between the portions 34 and 35.

After the straining and supporting plate 26" is put into place, this plate is positioned to inclose the band 25 and the marginal edges 29 of the filter element 24, and the plate is then rotated until the inclined portions 34 engage the lip 32 on the lugs or brackets 31. Further, rotation of the plate 26 causes this plate to be tightly clamped against the filter pad or element 24 until the lip 32 passes entirely beyond the filter 39. At this point in the operation, the clamping and supporting plate is relatively loose with respect to the straining receptacle or at least is not clamped as tightly as it has been in the rotation of the plate. If the plate 26" is rotated in either direction from this position, the pad 24 will be clamped more tightly. If it is desired to clamp the pad, the rotation of the plate is continued, the lip 32 engaging the inclined portion 36 and forcing the clamping and supporting plate against the filter pad. When it is desired to remove the clamping and supporting plate 26", this plate is rotated in the direction opposite the direction of rotation used in attaching the plate. This rotation of the plate 26" in the opposite direction will disengage the lip 32 of each lug 31 from the inclined portion 36 so that this plate will be relatively loose. Further rotation will cause the lip 32 to engage the shoulder 39 and thus further rotation will cause the plate to again clamp the plate 26" more securely before the lip 32 engages the inclined portion 34 and until the projecting portion 33 is pivoted out of registry with the lip 32.

From the foregoing description of the operation of applying and removing the clamping and supporting plate 26", it will be apparent that when this plate is in the clamping position illustrated in Figure 9, any tendency for the plate to come loose with respect to the receptacle cannot entirely disengage the projecting portions 33 from the lugs 31. This is true because when the lip 32 engages the intermediate portion 35 of the projecting element 33, rotation of the plate 26" in either direction will cause the plate to clamp the pad more tightly.

This action cannot take place accidentally as there is no force tending to rotate the shoulder 39 beyond the lip 32. Thus while the plate 32 might become slightly loosened with respect to the strainer, it cannot come free of the same. It will be noted that while the plate 26" is in place, the band 25 cannot come off the shoulder 23'. Thus even though the plate 26" becomes loosened somewhat with respect to the remainder of the strainer, this loosening will not permit disengagement of the band 25 from the shoulder 23'. Thus the edges 29 of the strainer pad or element 24 cannot come loose and no liquid may pass through the performations 28 in the plate 26 without passing through this shoulder or strainer pad.

In the strainer A" illustrated in Figures 8 and 9, I have disclosed a slightly different form of dome indicated by the numeral 21". The rounded top 22" of this dome is provided with openings therethrough to permit a flow of liquid but to deflect this liquid into engagement with the under surface of the cup or dome. This I accomplish by dividing the closed top 22" into a series of small sections which may be square in shape. Alternate of these squares or sections 40 are deformed into short, shallow troughs 41 which are bent slightly below the surface of the top 22". Liquid striking these troughs 41 is deflected along the sides of the trough and through the narrow slits 42 on either side of the trough. This liquid will therefore be deflected onto the under surface of the top 22" from where it will flow down through the inverted dome or cup 21". Thus the strainer element 24 will not be injured by liquid poured into the strainer as none of this liquid flowing down with force upon the inverted cup 21″ will strike the pad 24 without first being deflected. A number of small openings 43″ are provided in the wall of the inverted cup 21″ to permit liquid in the frustro-conical portion 16 of the strainer A to drain from the strainer.

On the supporting plate 26″ I may, if desired, provide downwardly extending guide loops 30 secured to the flange 27″ encircling this plate. These guide loops act to guide the strainer A″ into the neck of the milk can B and also provide a means of grasping the supporting and clamping plate 26″ to rotate the same.

It will be noted that the ring 25 is formed of resilient material. Such a ring or band has an advantage of compensating for any irregularities in the construction of the collar 23 or 23′ and should this collar be deformed slightly, the band 24 will still hold the filter pad in engagement with the same. It will be noted that with my strainer no milk, sediment or dirt is allowed to flow past the filter pad without passing through the same, and that no sediment or dirt is allowed to enter the interior of the strainer while the pads are being changed. The method of supporting the strainer holds the strainer at a convenient height and the strainer element may be easily seen as it is on the upper surface of the strainer when the same is supported in inverted position. No part of the strainer which comes in contact with the milk need be handled by the operator. In the modified form shown in Figures 8 and 9, the lugs 31 not only act to lock the clamping plate in place, but also provide a guide for applying the pads as the spacing of these lugs indicates the proper position of the pad.

In accordance with the patent statutes I have described the principles of construction and operation of my strainer, and while I have endeavored to set forth the best embodiments thereof, I desire to have it understood that this is only illustrative of a means of carrying out my invention and that obvious changes may be made within the scope of the following claims without departing from the spirit of my invention.

I claim:

1. A strainer including two parts, one of said parts comprising a strainer receptacle, and the other of said parts comprising a clamping plate, a strainer element interposed between said clamping plate and said straining receptacle, said two parts having opening means therethrough to permit liquid to flow therethrough and through said straining element, and cooperable clamping means between said two parts, said clamping means including lug means on one of said parts and cam means on the other of said parts engageable with said lug means upon relative rotation between said parts, said cam means including an inclined first portion to first clamp said two parts closely together, and a second inclined portion starting at a point below the top of the first inclined portion to then relieve pressure between said two parts, and to again clamp said two parts closely together.

2. A milk strainer or the like, including a funnel-like body, an internal fixed dome having a virtually closed top secured in the lower end of said body, and means for clamping a strainer element over the lower outer open end of said funnel-like body and dome, said means including a ring element to engage the marginal periphery of the strainer element and to hold the same tight against the projecting wall of the lower end of said funnel-like body, and a cup-like clamping plate extending over the strainer element and said ring.

ALVIN W. FRANZMEIER.